United States Patent
Gorer et al.

(10) Patent No.: US 7,101,639 B2
(45) Date of Patent: Sep. 5, 2006

(54) FUEL CELL ELECTROCATALYST OF PT-RH-MO-NI/FE

(75) Inventors: Alexander Gorer, San Jose, CA (US); Peter Strasser, Mountain View, CA (US); Martin Devenney, Mountain View, CA (US); Qun Fan, Fremont, CA (US); Konstantinos Chondroudis, Sunnyvale, CA (US); Daniel M. Giaquinta, Mountain View, CA (US); Ting He, Dublin, OH (US); Hiroyuki Oyanagi, Saitama-ken (JP); Kenta Urata, Saitama-ken (JP); Kazuhiko Iwasaki, Saitama-ken (JP); Hiroichi Fukuda, Saitama-ken (JP)

(73) Assignees: Symyx Technologies, Inc., Santa Clara, CA (US); Honda Giken Kogyo Kabushiki Kaisha, Tokyo (JP)

( * ) Notice: Subject to any disclaimer, the term of this patent is extended or adjusted under 35 U.S.C. 154(b) by 490 days.

(21) Appl. No.: 10/364,967

(22) Filed: Feb. 12, 2003

(65) Prior Publication Data

US 2003/0232235 A1 Dec. 18, 2003

Related U.S. Application Data

(60) Provisional application No. 60/356,192, filed on Feb. 12, 2002.

(51) Int. Cl.
*H01M 4/86* (2006.01)
(52) U.S. Cl. .............. 429/40; 429/44; 429/100; 502/314
(58) Field of Classification Search ............. 429/100, 429/44, 40; 502/314
See application file for complete search history.

(56) References Cited

U.S. PATENT DOCUMENTS

| | | | |
|---|---|---|---|
| 3,622,289 A | 11/1971 | Hansen et al. | |
| 3,718,418 A | 2/1973 | Fleming et al. | |
| 3,840,471 A | 10/1974 | Acres | |
| 4,781,803 A | 11/1988 | Harris et al. | |
| 5,068,161 A | 11/1991 | Keck et al. | |
| 5,876,867 A | 3/1999 | Itoh et al. | |
| 6,036,791 A * | 3/2000 | Mitsuhashi et al. | 148/404 |
| 6,045,671 A | 4/2000 | Wu et al. | |
| 6,048,633 A | 4/2000 | Fujii et al. | |
| 6,127,058 A | 10/2000 | Pratt et al. | |
| 6,165,635 A | 12/2000 | Auer et al. | |
| 6,187,164 B1 | 2/2001 | Warren et al. | |
| 6,187,468 B1 | 2/2001 | Shinkai et al. | |
| 6,294,280 B1 | 9/2001 | Tanaka et al. | |
| 6,855,452 B1 * | 2/2005 | Cooper et al. | 429/41 |
| 2002/0132040 A1 | 9/2002 | Finkelshtain et al. | |

FOREIGN PATENT DOCUMENTS

| | | |
|---|---|---|
| EP | 1 156 543 A2 | 11/2001 |
| EP | 1 164 651 A1 | 12/2001 |
| GB | 2 079 787 A | 1/1982 |
| GB | 2 250 929 A | 6/1992 |
| JP | 5-217586 A | 8/1993 |
| JP | 10-212592 A | 8/1998 |
| JP | 2001-181672 * | 7/2001 |
| WO | WO 94/10715 | 5/1994 |
| WO | WO 00/23921 | 4/2000 |

OTHER PUBLICATIONS

Gurau, B. et al.—"Structural and Electrochemical Characterization of Binary, Ternary, and Quaternary Platinum Alloy Catalysts for Methanol Electro-oxidation", J. Phys. Chem., 1998, pp. 9997-10003, v. 102.
Reddington, E. et al.—"Combinatorial Electrochemistry: A Highly Parallel, Optical Screening Method for Discovery of Better Electrocatalysts", Science, Jun. 12, 1998, pp. 1735-1737, v. 280.
Shim, J. et al.—"Characteristics for Electrocatalytic Properties and Hydrogen-oxygen Absorption of Platinum Ternary Allow Catalysts in Polymer Electrolyte Fuel Cell", Electrochimica Acta, 2000, pp. 1943-1951, v. 45 No. 12.
Urban, P. et al.—"Catalytic Processes in Solid Polymer Electrolyte Fuel Cell Systems", Applied Catalysts A: General, 2001, pp. 459-470, v. 221.
Chu et al., Methanol Electro-oxidation on Unsupported Pt-Ru Alloys at Different Temperatures; J. Electrochem. Soc., vol. 143, No. 5, May 1996, pp. 1685-1690.
Schmidt et al., Characterization of High-Surface-Area Electrocatalysts Using a Rotating Disk Electrode Configuration; J. Electrochem. Soc., vol. 145, No. 7, Jul. 1998, pp. 2354-2358.
Schmidt et al., Rotating Disk Electrode Measurements on the CO Tolerance of a High-Surface Area Pt/Vulcan Carbon Fuel Cell Catalyst; Journal of the Electrochemical Society, vol. 146, No. 4, 1999; pp. 1296-1304.
Strasser et al. Combinatorial Electrochemical Technique for Discovery of the New Fuel-Cell Cathode Materials, vol. 2001-4, 2001; pp. 191-208.

(Continued)

*Primary Examiner*—Laura Weiner
(74) *Attorney, Agent, or Firm*—Senniger Powers

(57) ABSTRACT

An improved metal alloy fuel cell electrocatalyst composition containing platinum, rhodium, molybdenum, and nickel iron or a combination thereof.

23 Claims, 4 Drawing Sheets

OTHER PUBLICATIONS

Yasuda et al., Polymerization-Pressure Dependencies of Properties of Perfluorosulfonate Cation-Exchanger Thin Films by Plasma Polymerization; Berichte Der Bunsen-,0Gesellschaft, An International Journal of Physical Chemistry; Jan. 1994, No. 1; pp. 631-635.

Ralph et al., Catalysis for Low Temperature Fuel Cells, Part I: The Cathode Challenges; Platinum Metals Rev., 2002, vol. 46 (1); pp. 3-14.

Strasser et al., Combinatorial Electrochemical Techniques for the Discovery of New Fuel-Cell Electrode Materials, Proceedings of the International Symposium on Fuel Cells for Vehicles, 41st Battery Symposium, The Electrochemical Society of Japan, Nagoya, 2000, pp. 34-35.

* cited by examiner

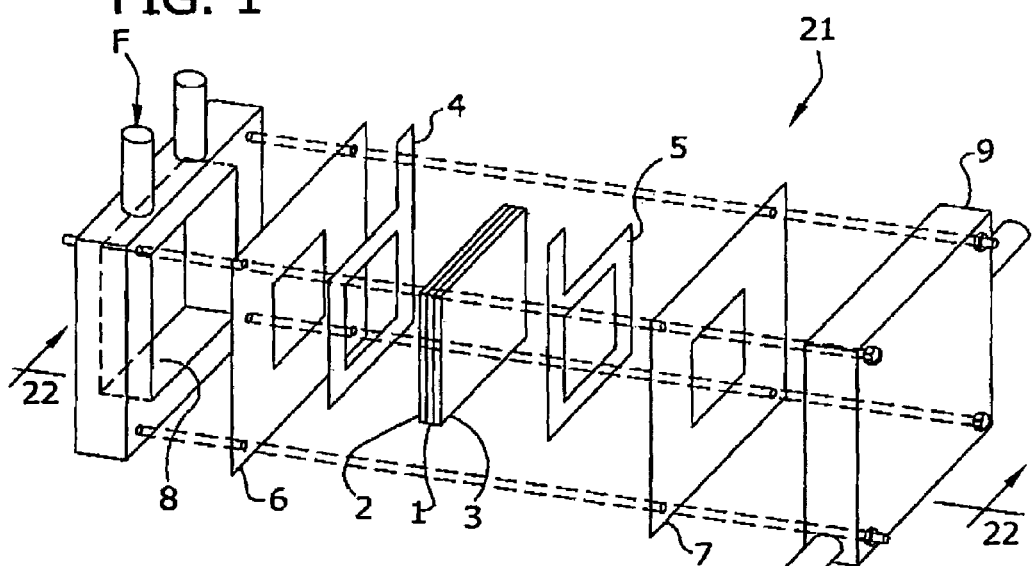
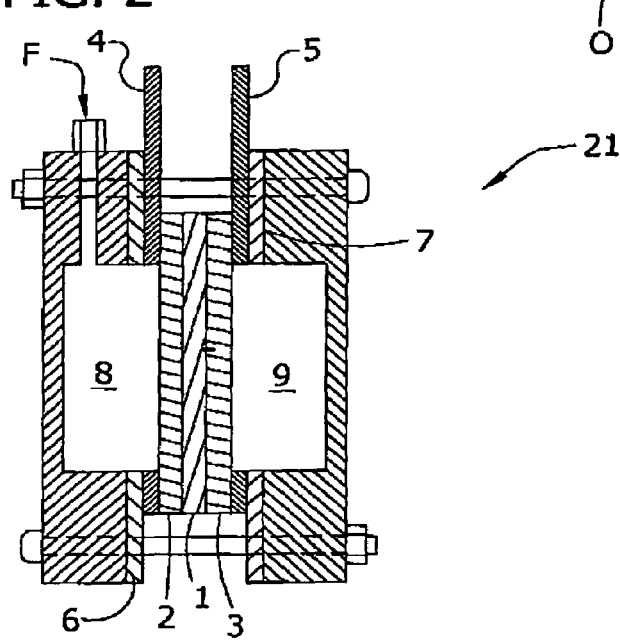

FIG. 4

| Electrode Number | Relative Activity compared to Platinum (-0.35 mA/cm²) | End Current Density (Absolute activity) mA/cm² | End Current Density / weight fraction of Pt | Pt atomic % | Rh atomic % | Mo atomic % | Ni atomic % |
|---|---|---|---|---|---|---|---|
| 53 | 2.323 | -0.813 | -1.311 | 38.62 | 7.07 | 18.74 | 35.57 |
| 55 | 2.322 | -0.813 | -1.294 | 36.68 | 6.71 | 5.93 | 50.68 |
| 54 | 2.234 | -0.782 | -1.253 | 37.62 | 6.89 | 12.17 | 43.32 |
| 52 | 2.212 | -0.774 | -1.256 | 39.67 | 7.26 | 25.67 | 27.41 |
| 51 | 2.018 | -0.706 | -1.153 | 40.77 | 7.46 | 32.98 | 18.78 |
| 45 | 2.008 | -0.703 | -1.301 | 31.98 | 14.05 | 18.62 | 35.35 |
| 46 | 1.939 | -0.679 | -1.248 | 31.16 | 13.69 | 12.10 | 43.06 |
| 47 | 1.867 | -0.654 | -1.193 | 30.38 | 13.34 | 5.90 | 50.38 |
| 50 | 1.856 | -0.650 | -1.068 | 41.95 | 7.68 | 40.72 | 9.66 |
| 37 | 1.826 | -0.639 | -1.412 | 25.42 | 20.94 | 18.51 | 35.13 |
| 44 | 1.768 | -0.619 | -1.153 | 32.84 | 14.43 | 25.50 | 27.23 |
| 38 | 1.719 | -0.601 | -1.319 | 24.78 | 20.40 | 12.02 | 42.79 |
| 43 | 1.689 | -0.591 | -1.109 | 33.75 | 14.83 | 32.76 | 18.66 |
| 39 | 1.670 | -0.585 | -1.273 | 24.16 | 19.90 | 5.86 | 50.08 |
| 36 | 1.611 | -0.564 | -1.254 | 26.11 | 21.50 | 25.34 | 27.05 |
| 42 | 1.471 | -0.515 | -0.972 | 34.72 | 15.25 | 40.44 | 9.59 |
| 35 | 1.347 | -0.471 | -1.056 | 26.83 | 22.09 | 32.55 | 18.53 |
| 34 | 1.055 | -0.369 | -0.832 | 27.59 | 22.72 | 40.17 | 9.53 |

FIG. 5

| Powder Name | Target Catalyst Composition and Max Heat Treatment Temperature | Actual Catalyst Composition | Target Pt Loading (wt%) | Measured Pt Loading (wt%) | Log Pt Mass Activity at +0.15 V MMS | Pt Mass Activity at +0.15 V MMS (mA/mg Pt) | Relative performance at +0.15 V MMS | Catalyst Mass Activity at +0.15 V MMS (mA/mg) |
|---|---|---|---|---|---|---|---|---|
| HFC 10 | Pt | Pt | 37.9 | 37.9 | 2.11 | 128.82 | 1.00 | 48.82 |
| HG-2-700 | Pt$_{38}$Rh$_7$Mo$_{19}$Ni$_{36}$ 700 °C | Pt$_{49}$Rh$_8$Mo$_5$Ni$_{38}$ by ICP | 30 | 37.9 | 1.79 | 61.22 | 0.48 | 30.00 |
| HG-2-900 | Pt$_{38}$Rh$_7$Mo$_{19}$Ni$_{36}$ 900 °C | Pt$_{50}$Rh$_7$Mo$_5$Ni$_{38}$ by ICP | 30 | 49 | 1.41 | 25.52 | 0.20 | 12.51 |
| HFC 138 | Pt$_{38}$Rh$_7$Mo$_{19}$Ni$_{36}$ 700 °C | Pt$_{33}$Rh$_7$Mo$_{25}$Ni$_{35}$ by EDS | 17 | 16.1 | 2.54 | 343.28 | 2.66 | 55.27 |
| HFC139 | Pt$_{38}$Rh$_7$Mo$_{19}$Ni$_{36}$ 900 °C | not measured | 17 | — | — | — | — | 30.46 |
| HFC 136 | Pt$_{20}$Rh$_{20}$Mo$_{40}$Fe$_{20}$ 700 °C | Pt$_{19}$Rh$_{18}$Mo$_{46}$Fe$_{17}$ by EDS | 14.3 | 12.9 | 2.53 | 340.90 | 2.65 | 43.98 |
| HFC 137 | Pt$_{20}$Rh$_{20}$Mo$_{40}$Fe$_{20}$ 700 °C | not measured | 14.3 | — | — | — | — | 41.78 |

FUEL CELL ELECTROCATALYST OF PT-RH-MO-NI/FE

CROSS-REFERENCE TO RELATED APPLICATION

This application claims the benefit of U.S. Provisional Application No. 60/356,192, filed Feb. 12, 2002.

BACKGROUND OF THE INVENTION

1. Field of the Invention

The present invention relates to metal alloys, comprising platinum, rhodium, molybdenum, and nickel, iron, or a combination thereof. The alloys are useful as catalysts, in general, and as electrocatalysts in fuel cell electrodes, in particular.

2. Background Information

A fuel cell is an electrochemical device for directly converting the chemical energy generated from an oxidation-reduction reaction of a fuel such as hydrogen or hydrocarbon-based fuels and an oxidizer such as oxygen gas (in air) supplied thereto into a low-voltage direct current. Thus, fuel cells chemically combine the molecules of a fuel and an oxidizer without burning, dispensing with the inefficiencies and pollution of traditional combustion.

A fuel cell is generally comprised of a fuel electrode (anode), an oxidizer electrode (cathode), an electrolyte interposed between the electrodes (alkaline or acidic), and means for separately supplying a stream of fuel and a stream of oxidizer to the anode and the cathode, respectively. In operation, fuel supplied to the anode is oxidized, releasing electrons which are conducted via an external circuit to the cathode. At the cathode, the supplied electrons are consumed when the oxidizer is reduced. The current flowing through the external circuit can be made to do useful work.

There are several types of fuel cells, including: phosphoric acid, molten carbonate, solid oxide, potassium hydroxide, and proton exchange membrane. A phosphoric acid fuel cell operates at about 160–220° C., and preferably at about 190–200° C. This type of fuel cell is currently being used for multi-megawatt utility power generation and for co-generation systems (i.e., combined heat and power generation) in the 50 to several hundred kilowatts range.

In contrast, proton exchange membrane fuel cells use a solid proton-conducting polymer membrane as the electrolyte. Typically, the polymer membrane is maintained in a hydrated form during operation in order to prevent loss of ionic conduction which limits the operation temperature typically to between about 70 and about 120° C. depending on the operating pressure, and preferably below about 100° C. Proton exchange membrane fuel cells have a much higher power density than liquid electrolyte fuel cells (e.g., phosphoric acid), and can vary output quickly to meet shifts in power demand. Thus, they are suited for applications such as in automobiles and small scale residential power generation where quick startup is consideration.

In some applications (e.g., automotive) pure hydrogen gas is the optimum fuel; however, in other applications where a lower operational cost is desirable a reformed hydrogen-containing gas is an appropriate fuel. A reformed-hydrogen containing gas is produced, for example, by steam-reforming methanol and water at 200–300° C. to a hydrogen-rich fuel gas containing carbon dioxide. Theoretically, the reformate gas consists of 75 vol % hydrogen and 25 vol % carbon dioxide. In practice, however, this gas also contains nitrogen, oxygen, and, depending on the degree of purity, varying amounts of carbon monoxide (up to 1 vol %). Although some electronic devices also reform liquid fuel to hydrogen, in some applications the conversion of a liquid fuel directly into electricity is desirable, as then a high storage density and system simplicity are combined. In particular, methanol is an especially desirable fuel because it has a high energy density, a low cost, and is produced from renewable resources.

For the oxidation and reduction reactions in a fuel cell to proceed at useful rates, especially at operating temperatures below about 300° C., electrocatalyst materials are typically provided at the electrodes. Initially, fuel cells used electrocatalysts made of a single metal, usually platinum (Pt), palladium (Pd), rhodium (Rh), iridium (Ir), osmium (Os), silver (Ag) or gold (Au) because they are able to withstand the corrosive environment—platinum being the most efficient and stable single-metal electrocatalyst for fuel cells operating below about 300° C. While these elements were first used in fuel cells in metallic powder form, later techniques were developed to disperse these metals over the surface of electrically conductive supports (e.g., carbon black) to increase the surface area of the electrocatalyst which in turn increased the number of reactive sites leading to improved efficiency of the cell. Nevertheless, fuel cell performance typically declines over time because the presence of electrolyte, high temperatures and molecular oxygen dissolve the electrocatalyst and/or sinter the dispersed electrocatalyst by surface migration or dissolution/re-precipitation.

Although platinum is the most efficient and stable single-metal electrocatalyst for fuel cells, it is costly and an increase in electrocatalyst activity over platinum is necessary for wide scale commercialization of fuel cell technology. The development of cathode fuel cell electrocatalyst materials faces longstanding challenges. The greatest challenge is the improvement of the electrode kinetics of the oxygen reduction reaction. In fact, sluggish electrochemical reaction kinetics have prevented attaining the thermodynamic reversible electrode potential for oxygen reduction. This is reflected in exchange current densities of around $10^{-10}$ to $10^{-12}$ A/cm$^2$ for oxygen reduction on, for example, Pt at low and medium temperatures. A factor contributing to this phenomenon include the fact that the desired reduction of oxygen to water is a four-electron transfer reaction and typically involves breaking a strong O—O bond early in the reaction. In addition, the open circuit voltage is lowered from the thermodynamic potential for oxygen reduction due to the formation of peroxide and possible platinum oxides which inhibit the reaction. A second challenge is the stability of the oxygen electrode (cathode) during long-term operation. Specifically, a fuel cell cathode operates in a regime in which even the most unreactive metals are not completely stable. Thus, alloy compositions which contain non-noble metal elements may have a rate of corrosion which would negatively impact the projected lifetime of a fuel cell. The corrosion may be more severe when the cell is operating near open circuit conditions (which is the most desirable potential for thermodynamic efficiency).

Electrocatalyst materials at the anode also face challenges during fuel cell operation. Specifically, as the concentration of carbon monoxide (CO) rises above about 10 ppm in the fuel the surface of the electrocatalyst can be rapidly poisoned. As a result, platinum (by itself) is a poor electrocatalyst if the fuel stream contains carbon monoxide (e.g., reformed-hydrogen gas typically exceeds 100 ppm). Liquid hydrocarbon-based fuels (e.g., methanol) present an even greater poisoning problem. Specifically, the surface of the platinum becomes blocked with the adsorbed intermediate, carbon monoxide (CO). It has been reported that $H_2O$ plays a key role in the removal of such poisoning species in accordance with the following reactions:

(1);

(2); and

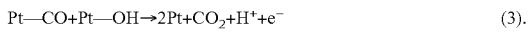

(3).

As indicated by the foregoing reactions, the methanol is adsorbed and partially oxidized by platinum on the surface of the electrode (1). Adsorbed OH, from the hydrolysis of water, reacts with the adsorbed CO to produce carbon dioxide and a proton (2,3). However, platinum does not form OH species well at the potentials fuel cell electrodes operate (e.g., 200 mV–1.5 V). As a result, step (3) is the slowest step in the sequence, limiting the rate of CO removal, thereby allowing poisoning of the electrocatalyst to occur. This applies in particular to a proton exchange membrane fuel cell which is especially sensitive to CO poisoning because of its low operating temperatures.

One technique for increasing electrocatalytic cathodic activity during the reduction of oxygen and electrocatalytic anodic activity during the oxidation of hydrogen is to employ an electrocatalyst which is more active, corrosion resistant, and/or more poison tolerant. For example, increased tolerance to CO has been reported by alloying platinum and ruthenium at a 50:50 atomic ratio (see, D. Chu and S. Gillman, J. Electrochem. Soc. 1996, 143, 1685). The electrocatalysts proposed to date, however, leave room for further improvement.

BRIEF SUMMARY OF THE INVENTION

Briefly, therefore, the present invention is directed to an electrocatalyst for use in electrochemical reactor devices. The electrocatalyst composition comprises platinum, rhodium, molybdenum, and nickel, iron, or a combination thereof.

The present invention is also directed to an alloy comprising platinum, rhodium, molybdenum, and nickel, iron, or a combination thereof.

The present invention is also directed to a supported electrocatalyst particle. The supported electrocatalyst particle comprising an electrocatalyst and electrically conductive support particle upon which the electrocatalyst is dispersed, the electrocatalyst comprising platinum, rhodium, molybdenum, and nickel, iron, or a combination thereof.

Additionally, the present invention is directed to a fuel cell electrode comprising an electrocatalyst. The electrocatalyst comprises platinum, rhodium, molybdenum, and nickel, iron, or a combination thereof, and an electrically conductive support upon which the electrocatalyst composition is deposited.

In another embodiment, the present invention is directed to a fuel cell comprising an anode, a cathode, a proton exchange membrane between the anode and the cathode, and an electrocatalyst for the catalytic oxidation of a hydrogen-containing fuel or the catalytic reduction of oxygen. The electrocatalyst comprises platinum, rhodium, molybdenum, and nickel, iron, or a combination thereof.

Further, the present invention is directed to a method for the electrochemical conversion of a hydrogen-containing fuel and oxygen to reaction products and electricity in a fuel cell. The fuel cell comprises an anode, a cathode, a proton exchange membrane therebetween, and an electrically conductive external circuit connecting the anode and cathode. The method comprises contacting the hydrogen-containing fuel or the oxygen and an electrocatalyst to catalytically oxidize the hydrogen-containing fuel or catalytically reduce the oxygen. The electrocatalyst comprises platinum, rhodium, molybdenum, and nickel, iron, or a combination thereof.

The foregoing and other features and advantages of the present invention will become more apparent from the following description and accompanying drawing.

BRIEF DESCRIPTION OF THE SEVERAL VIEWS OF THE DRAWING

FIG. 1 is a schematic structural view showing members of a fuel cell.

FIG. 2 is a cross-sectional side view of a fuel cell.

FIG. 4 is a table containing electrochemical measurements for alloy electrocatalysts of the present invention.

FIG. 5 is a table containing electrochemical measurements for supported alloy electrocatalysts of the present invention.

DETAILED DESCRIPTION OF THE INVENTION

Figure 3:
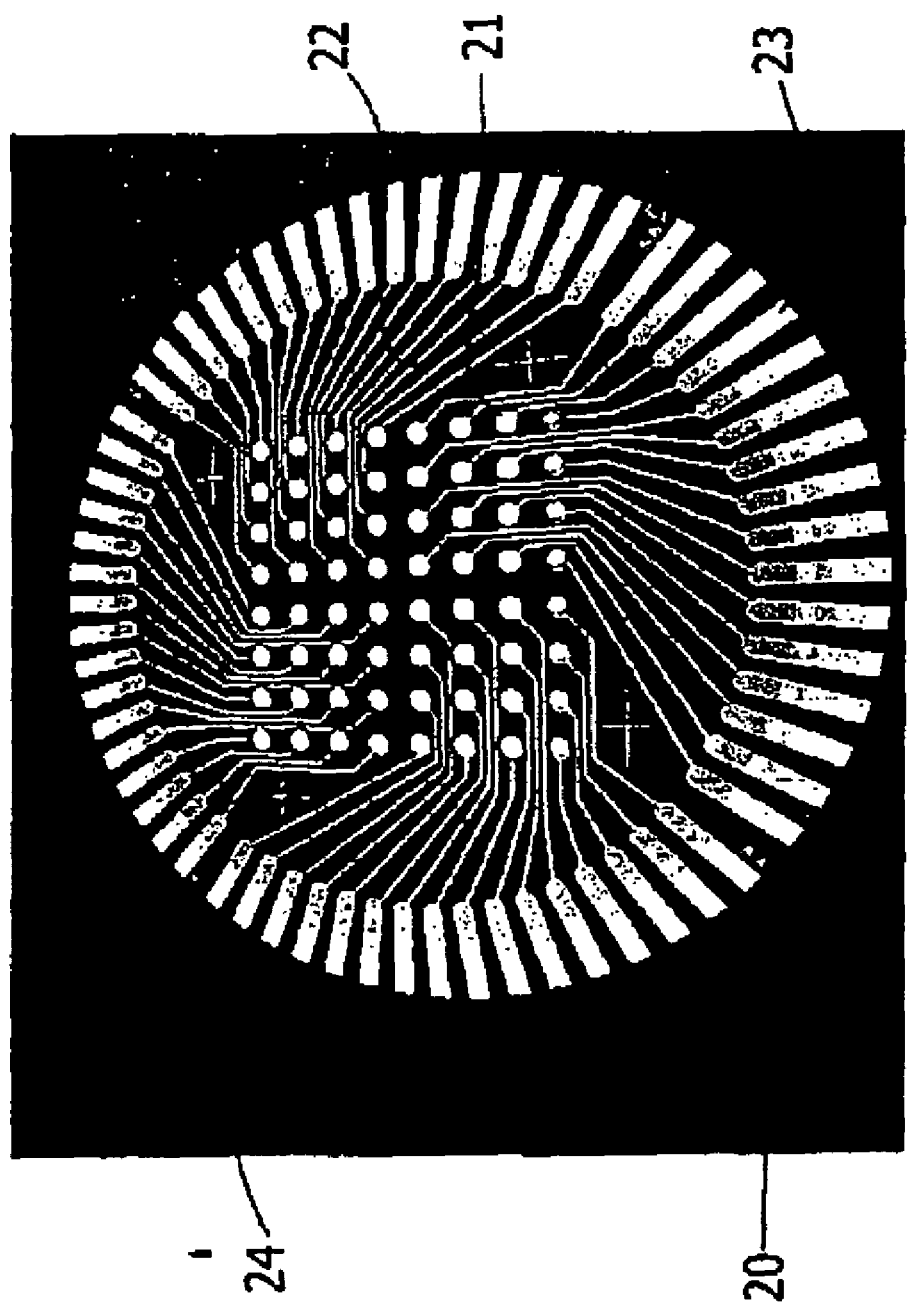
FIG. 3 is a photograph of an electrode array comprising thin-film alloy compositions deposited on individually addressable electrodes prepared as described in Example 1.

The present invention is directed to a multi-component metal-containing substance having electrocatalytic activity for use in fuel cells (i.e., an electrocatalyst). Preferably, the multi-component metal-containing electrocatalyst comprises an alloy of the components. However, the electrocatalyst may be a mixture of discrete amounts of the components (e.g., a mixture of metal powders), wherein a discrete amount of the components may comprise a single component or a combination of components (e.g., an alloy).

In general, it is desirable to decrease the concentration of noble metals (especially platinum) to reduce the cost of an electrocatalytic alloy. However, as the concentrations of noble metals are decreased the electrocatalyst alloy may become more susceptible to corrosion. Thus, it is desirable to achieve the most activity per weight percent of noble metals without compromising the life cycle of the fuel cell in which the electrocatalyst is placed (see, end current density/weight fraction of platinum as set forth in FIG. 4).

The present invention is directed to metal compositions comprising platinum, rhodium, molybdenum, and nickel, iron, or a combination thereof. Preferably, such metal compositions have an improved corrosion resistance and/or improved activity compared to platinum. In one embodiment, the electrocatalyst composition consists essentially of platinum, rhodium, molybdenum, and nickel or iron. In general, a catalyst composition of the present invention comprises at least a catalytically active amount of platinum, rhodium, molybdenum, and nickel and/or iron (e.g., greater than 0.1 atomic percent) and no more than about 50 atomic percent of platinum, no more than about 50 atomic percent of rhodium, no more than about 55 atomic percent of molybdenum, and no more than about 55 atomic percent of nickel and/or iron.

Pt—Rh—Mo—Ni Alloy Electrocatalyst Compositions

Electrocatalytically useful alloys comprising platinum, rhodium, molybdenum, and nickel have been discovered throughout relatively wide compositional ranges of the alloy constituents. For example, the concentration of platinum in such alloys is typically between about 10 and about 50 atomic percent. In one embodiment, the concentration of platinum narrowed to between about 20 and about 50 atomic percent. In another embodiment, the concentration of platinum is further narrowed to between about 30 and about 50 atomic percent. Similarly, the rhodium concentration is typically between about 1 and about 25 atomic percent. In one embodiment, the concentration of rhodium is between about 5 and about 25 atomic percent. In another embodiment, the concentration of rhodium is between about 5 about 15 atomic percent. The concentration of molybdenum is typically between about 5 and about 45 atomic percent. In one embodiment, the concentration of molybdenum is between 5 and about 35 atomic percent. In another embodiment, the concentration of molybdenum is between about 5 and about 25 atomic percent. The concentration of nickel is typically between about 5 and about 55 atomic percent. In one embodiment, the concentration of nickel is between about 25 and 50 atomic percent. In another embodiment, the concentration of nickel is between about 30 and about 40 atomic percent.

Additionally, it has been discovered that improved electrocatalytic activity is achieved by controlling the relative concentrations of the various metals. For example, in one embodiment, the concentration of platinum is between about 30 and about 50 atomic percent, the concentration of rhodium is between about 1 and 25 atomic percent, the concentration of molybdenum is between about 5 and about 15 atomic percent, and the concentration of nickel is between about 5 and 55 atomic percent. In another embodiment, the concentration of platinum is between about 20 and about 50 atomic percent, the concentration of rhodium is between about 5 and about 25 atomic percent, the concentration of molybdenum is between about 5 and about 45 atomic percent, and the concentration of nickel is between about 5 and about 55 atomic percent. Quaternary alloys possessing significantly improved electrocatalytic activity over platinum have been discovered within the immediately preceding compositional ranges by controlling the constituent concentrations so that the sum of the concentrations of platinum and rhodium is between about 40 and about 50 atomic percent, or alternatively, the sum of the concentrations of molybdenum and nickel is between about 50 and about 60 atomic percent. In yet another embodiment, the concentration of platinum is between about 30 and about 40 atomic percent, the concentration of rhodium is between about 5 and about 10 atomic percent, the concentration of molybdenum is between about 5 and about 35 atomic percent, and the concentration of nickel is between about 25 and about 50 atomic percent.

Specific Pt—Rh—Mo—Ni alloy compositions that have been found to exhibit an oxygen reduction activity greater than an internal platinum standard (described in greater detail, infra) are set forth in FIG. 4. A further alloy composition that has been found to exhibit improved oxygen reduction activity is $Pt_{33}Rh_7Mo_{25}Ni_{35}$, which was synthesized as a carbon supported electrocatalyst powder (described in greater detail, infra).

Pt—Rh—Mo—Fe Alloy Electrocatalyst Compositions

Electrocatalytically useful alloys comprising platinum, rhodium, molybdenum, and iron have been discovered throughout relatively wide compositional ranges of the alloy constituents. For example, the concentration of platinum in such alloys is typically between about 5 and about 35 atomic percent. In one embodiment, the concentration of platinum is narrowed to between about 10 and about 30 atomic percent. In another embodiment, the concentration of platinum is further narrowed to between about 15 and about 25 atomic percent. Similarly, the rhodium concentration is typically between about 5 and about 35 atomic percent. In one embodiment, the concentration of rhodium is between about 10 and about 30 atomic percent. In another embodiment, the concentration of rhodium is between about 15 about 25 atomic percent. The concentration of molybdenum is typically between about 25 and about 55 atomic percent. In one embodiment, the concentration of molybdenum is between 30 and about 50 atomic percent. In another embodiment, the concentration of molybdenum is between about 35 and about 45 atomic percent. The concentration of iron is typically between about 5 and about 35 atomic percent. In one embodiment, the concentration of iron is between about 10 and 30 atomic percent. In another embodiment, the concentration of iron is between about 15 and about 25 atomic percent.

Additionally, it has been discovered that improved electrocatalytic activity is achieved by controlling the relative concentrations of the various metals. For example, in one embodiment the concentration of platinum is between about 10 and about 30 atomic percent, the concentration of rhodium is between about 10 and about 30 atomic percent, the concentration of molybdenum is between about 30 and about 55 atomic percent, and the concentration of iron is between about 10 and about 30 atomic percent. In yet another embodiment, the concentration of platinum is between about 15 and about 25 atomic percent, the concentration of rhodium is between about 15 and about 25 atomic percent, the concentration of molybdenum is between about 35 and about 45 atomic percent and the concentration of iron is between about 15 and about 25 atomic percent.

A specific Pt—Rh—Mo—Fe alloy composition found to exhibit improved oxygen reduction activity contains about 20 atomic percent platinum, about 20 atomic percent rhodium, about 40 atomic percent molybdenum, and about 20 atomic percent iron. Additionally, the alloy composition of $Pt_{19}Rh_{18}Mo_{47}Fe_{17}$ was synthesized as a carbon supported electrocatalyst powder and was found to exhibit improved oxygen reduction activity over a carbon supported platinum powder.

Pt—Rh—Mo—Ni—Fe Alloy Electrocatalyst Compositions

Electrocatalytically useful alloys comprising platinum, rhodium, molybdenum, nickel, and iron have been discovered throughout relatively wide compositional ranges of the alloy constituents. For example, the concentration of platinum in such alloys is typically between about 0.1 and about 50 atomic percent. Similarly, the rhodium concentration is typically between about 0.1 and about 50 atomic percent. The concentration of molybdenum is typically between about 0.1 and about 55 atomic percent. The combined concentrations of nickel and iron is typically between about 0.1 and 55 atomic percent.

The stoichiometric alloy compositions of the present invention refer to overall stoichiometries, or bulk stoichiometries, of a prepared electrocatalysts prior to being subjected to an electrocatalytic reaction. That is, a reported alloy composition is an average stoichiometry over the entire volume of the prepared electrocatalyst composition, and therefore, localized stoichiometric variations may exist. For example, the volume of an electrocatalyst alloy particle comprising the surface and the first few atomic layers inward therefrom may differ from the bulk stoichiometry. Likewise, within the bulk of the particle there may be stoichiometric variations. The surface stoichiometry corresponding to a particular bulk stoichiometry is highly dependant upon the method and conditions under which the electrocatalyst alloy is prepared and alloys having the same bulk stoichiometry may have significantly different surface stoichiometries. Without being bound to a particular theory, it is believed the differing surface stoichiometries is due at least in part to differences in the atomic arrangements, chemical phases and homogeneity of the electrocatalysts. Further, it has been reported that subjecting an electrocatalyst composition to an electrocatalytic reaction (e.g., the operation of a fuel cell) may change the composition by leaching one or more alloy constituents from the alloy (see, Catalysis for Low Temperature Fuel Cells Part 1: The Cathode Challenges, T. R. Ralph and M. P. Hogarth, Platinum Metals Rev., 2002, 46, (1), p. 3–14). This leaching effect may, in fact, increase the activity of the electrocatalyst by increasing the surface area and/or by changing the surface composition of the electrocatalyst. In fact, the purposeful leaching of electrocatalyst compositions after synthesis to increase the surface area has been disclosed by Itoh et al. in U.S. Pat. No. 5,876,867. As such, the alloy compositions of the present invention are intended to include starting bulk stoichiometries, any starting surface stoichiometries resulting therefrom, and modifications of the starting bulk and/or surface stoichiometries that are produced by subjecting the electrocatalyst to an electrocatalytic reaction.

Formation of an Electrocatalyst Alloy

The electrocatalyst alloys of the present invention may be formed by a variety of methods. For example, the appropriate amounts of the constituents may be mixed together and heated to a temperature above the respective melting points to form a molten solution of the metals which is cooled and allowed to solidify. Typically, electrocatalysts are used in a powder form to increase the surface area which increases the number of reactive sites and leads to improved efficiency of the cell. Thus, the formed metal alloy may be transformed into a powder after being solidified (e.g., by grinding) or during solidification (e.g., spraying molten alloy and allowing the droplets to solidify). It may, however, be advantageous to evaluate alloys for electrocatalytic activity in a non-powder form (see, Examples 1 and 2, infra).

To further increase surface area and efficiency, an electrocatalyst alloy for use in a fuel cell may deposited over the surface of electrically conductive supports (e.g., carbon black). One method for loading an electrocatalyst alloy onto supports typically comprises depositing metal precursor compounds onto the supports, and converting the precursor compounds to metallic form and alloying the metals using a heat-treatment in a reducing atmosphere (e.g., an atmosphere comprising an inert gas such as argon). A method for depositing the precursor compounds that is well known in the art involves chemical precipitation of precursor compounds onto the supports. The chemical precipitation method is typically accomplished by mixing supports and sources of the precursor compounds (e.g., an aqueous solution comprising one or more inorganic metallic salts) at a concentration sufficient to obtain the desired loading of the electrocatalyst on the supports and then precipitation of the precursor compounds is initiated (e.g., by adding an ammonium hydroxide solution). The slurry is then typically filtered from the liquid under vacuum, washed with deionized water, and dried to yield a powder that comprises the precursor compounds on the supports.

Another method for depositing the precursor compounds comprises forming a suspension comprising a solution and supports suspended therein, wherein the solution comprises a solvent portion and a solute portion that comprises the constituents of the precursor compound being deposited. The suspension is frozen to deposit (e.g., precipitate) the precursor compound on the particles. The frozen suspension is freeze-dried to remove the solvent portion and leave a freeze-dried powder comprising the supports and the deposits of the precursor compound on the supports.

The temperature reached during the thermal treatment is typically at least as high as the decomposition temperature(s) for the precursor compound(s) and not be so high as to result in degradation of the supports and agglomeration of the supports. Typically the temperature is between about 60° C. and about 1100° C. Inorganic metal-containing compounds typically decompose at temperatures between about 600 and about 1000° C.

The duration of the heat treatment is typically at least sufficient to substantially convert the precursor deposits to desired state. In general, the temperature and time are inversely related (i.e., conversion is accomplished in a shorter period of time at higher temperatures and vice versa). At the temperatures typical for converting the inorganic metal-containing compounds to a metal alloy set forth above, the duration of the heat treatment is typically at least about 30 minutes. In one embodiment, the duration is between about 2 and about 7 hours.

Incorporation of the Electrocatalyst Compositions in a Fuel Cell

Although the alloy compositions of the present invention can be used in any type of fuel cell (e.g., phosphoric acid, molten carbonate, solid oxide, potassium hydroxide, and proton exchange membrane), they are particularly suited for use in proton exchange membrane fuel cells. As shown in FIGS. 1 and 2, a fuel cell, generally indicated 21, comprises a fuel electrode, or anode, 2 and an air electrode, oxidizer electrode or cathode, 3. In between the electrodes 2, 3, a proton exchange membrane 1 serves as an electrolyte and it is usually a strongly acidic ion exchange membrane such as a perfluorosulphonic acid-based membrane. Preferably, the proton exchange membrane 1, the anode 2, and the cathode 3 are integrated into one body to minimize contact resistance between the electrodes and the proton exchange membrane. Current collectors 4 and 5 engage the anode and the cathode, respectively. A fuel chamber 8 and an air chamber 9 contain the respective reactants and are sealed by sealants 6 and 7, respectively.

In general, electricity is generated by hydrogen-containing fuel combustion (i.e., the hydrogen-containing fuel and oxygen react to form water, carbon dioxide and electricity). This is accomplished in the above-described fuel cell by introducing the hydrogen-containing fuel F into the fuel chamber 8, while oxygen O (preferably air) is introduced into the air chamber 9, whereby an electric current can be immediately transferred between the current collectors 4 and 5 through an outer circuit (not shown). Ideally, the hydrogen-containing fuel is oxidized at the anode 2 to produce hydrogen ions, electrons, and possibly carbon dioxide gas. The thus formed hydrogen ions migrate through the strongly acidic proton exchange membrane 1 and react with oxygen and electrons transferred through the outer circuit to the cathode 3 to form water. If the hydrogen-containing fuel F is methanol, it is preferably introduced as a dilute acidic solution to enhance the chemical reaction, thereby increasing power output (e.g., a 0.1 M methanol/0.5 M sulfuric acid solution).

To prevent the loss of ionic conduction in the proton exchange membranes, they typically remain hydrated during operation of the fuel cell. As a result, the material of the proton exchange membrane is typically selected to be resistant to dehydration at temperatures up to between about 100 and about 120° C. Proton exchange membranes usually have reduction and oxidation stability, resistance to acid and hydrolysis, sufficiently low electrical resistivity (e.g., <10 $\Omega$·cm), and low hydrogen or oxygen permeation. Additionally, proton exchange membranes are usually hydrophilic. This ensures proton conduction (by reversed diffusion of water to the anode), and prevents the membrane from drying out thereby reducing the electrical conductivity. For the sake of convenience, the layer thickness of the membranes is typically between 50 and 200 $\mu$m. In general, the foregoing properties are achieved with materials which have no aliphatic hydrogen-carbon bonds, which, for example, are achieved by replacing hydrogen with fluorine or by the presence of aromatic structures; the proton conduction results from the incorporation of sulfonic acid groups (high acid strength). Suitable proton-conducting membranes also include perfluorinated sulfonated polymers such as NAFION and its derivatives produced by E.I. du Pont de Nemours & Co., Wilmington, Del. NAFION is based on a copolymer made from tetrafluoroethylene and perfluorovinylether, and is provided with sulfonic groups working as ion-exchanging groups. Other suitable proton exchange membranes are produced with monomers such as perfluorinated compounds (e.g., octafluorocyclobutane and perfluorobenzene), or even monomers with C—H bonds which, in a plasma polymer, do not form any aliphatic H atoms which could constitute attack sites for oxidative breakdown.

The electrodes of the present invention comprise the electrocatalyst compositions of the present invention and an electrode substrate upon which the electrocatalyst is deposited. In one embodiment the electrocatalyst alloy is directly deposited on the electrode substrate. In another embodiment the electrocatalyst alloy is supported on electrically conductive supports and the supported electrocatalyst is deposited on the electrode substrate. The electrode may also comprise a proton conductive material that is in contact with the electrocatalyst. The proton conductive material may facilitate contact between the electrolyte and the electrocatalyst, and may thus enhance fuel cell performance. Preferably, the electrode is designed to increase cell efficiency by enhancing contact between the reactant (i.e., fuel or oxygen), the electrolyte and the electrocatalyst. In particular, porous or gas diffusion electrodes are typically used since they allow the fuel/oxidizer to enter the electrode from the face of the electrode exposed to the reactant gas stream (back face), and the electrolyte to penetrate through the face of the electrode exposed to the electrolyte (front face), and reaction products, particularly water, to diffuse out of the electrode.

The electrically conductive support particles typically comprise an inorganic material such as carbon. However, the support particles may comprise an organic material such as an electrically conductive polymer (see, U.S. Pat. appl. 2002/0132040 A1). Carbon supports may be predominantly amorphous or graphitic and they may be prepared commercially, or specifically treated to increase their graphitic nature (e.g., heat treated at a high temperature in vacuum or in an inert gas atmosphere) thereby increasing corrosion resistance. For example, it may be oil furnace black, acetylene black, graphite paper, carbon fabric, or carbon aerogel. A carbon aerogel preferably has an electrical conductivity of between $10^{-2}$ and $10^{3}$ $\Omega^{-1}$·cm$^{-1}$ and a density of between 0.06 and 0.7 g/cm$^3$; the pore size is between 20 and 100 nm (porosity up to about 95%). Carbon black support particles may have a Brunauer, Emmett and Teller (BET) surface area up to about 2000 m$^2$/g. It has been reported that satisfactory results are achieved using carbon black support particles having a high mesoporous area, e.g., greater than about 75 m$^2$/g (see, Catalysis for Low Temperature Fuel Cells Part 1: The Cathode Challenges, T. R. Ralph and M. P. Hogarth, Platinum Metals Rev., 2002, 46, (1), p. 3–14). Experimental results to date indicate that a surface area of about 500 m$^2$/g is preferred.

Preferably, the proton exchange membrane, electrodes, and electrocatalyst materials are in contact with each other. This is typically accomplished by depositing the electrocatalyst either on the electrode, or on the proton exchange membrane, and then placing the electrode and membrane in contact. The alloy electrocatalysts of this invention can be deposited on either the electrode of the membrane by a variety of methods, including plasma deposition, powder application (the powder may also be in the form of a slurry, a paste, or an ink), chemical plating, and sputtering. Plasma deposition generally entails depositing a thin layer (e.g., between 3 and 50 $\mu$m, preferably between 5 and 20 $\mu$m) of an electrocatalyst composition on the membrane using low-pressure plasma. By way of example, an organic platinum compound such as trimethylcyclopentadienylplatinum is gaseous between $10^{-4}$ and 10 mbar and can be excited using radio-frequency, microwaves, or an electron cyclotron resonance transmitter to deposit platinum on the membrane. According to another procedure, electrocatalyst powder is distributed onto the proton exchange membrane surface and integrated at an elevated temperature under pressure. If, however, the amount of electrocatalyst particles exceeds about 2 mg/cm$^2$ the inclusion of a binder such as polytetrafluoroethylene is common. Further, the electrocatalyst may be plated onto dispersed small support particles (e.g., the size is typically between 20 and 200 Å, and more preferably between about 20 and 100 Å). This increases the electrocatalyst surface area which in turn increases the number of reaction sites leading to improved cell efficiency. In one such chemical plating process, for example, a powdery carrier material such as conductive carbon black is contacted with an aqueous solution or aqueous suspension (slurry) of compounds of metallic components constituting the alloy to permit adsorption or impregnation of the metallic compounds or their ions on or in the carrier. Then, while the slurry is stirred at high speed, a dilute solution of suitable fixing agent such as ammonia, hydrazine, formic acid, or formalin is slowly added dropwise to disperse and deposit the metallic components on the carrier as insoluble compounds or partly reduced fine metal particles.

The loading, or surface concentration, of an electrocatalyst on the membrane or electrode is based in part on the desired power output and cost for a particular fuel cell. In general, power output increases with increasing concentration; however, there is a level beyond which performance is not improved. Likewise, the cost of a fuel cell increases with increasing concentration. Thus, the surface concentration of electrocatalyst is selected to meet the application requirements. For example, a fuel cell designed to meet the requirements of a demanding application such as an extraterrestrial vehicle will usually have a surface concentration of electrocatalyst sufficient to maximize the fuel cell power output. For less demanding applications, economic considerations dictate that the desired power output be attained with as little electrocatalyst as possible. Typically, the loading of electrocatalyst is between about 0.01 and about 6 mg/cm$^2$. Experimental results to date indicate that in some embodiments the electrocatalyst loading is preferably less than about 1 mg/cm$^2$, and more preferably between about 0.1 and 1 mg/cm$^2$.

To promote contact between the collector, electrode, electrocatalyst, and membrane, the layers are usually compressed at high temperature. The housings of the individual fuel cells are configured in such a way that a good gas supply is ensured, and at the same time the product water can be discharged properly. Typically, several fuel cells are joined to form stacks, so that the total power output is increased to economically feasible levels.

In general, the electrocatalyst compositions and fuel cell electrodes of the present invention may be used to electrocatalyze any fuel containing hydrogen (e.g., hydrogen and reformated-hydrogen fuels). The improved electrocatalytic activity of the electrocatalyst compositions, however, are particularly realized in the electrocatalysis of hydrocarbon-based fuels. Applicable hydrocarbon-based fuels include saturated hydrocarbons such as methane (natural gas), ethane, propane and butane; garbage off-gas; oxygenated hydrocarbons such as methanol and ethanol; and fossil fuels such as gasoline and kerosene; and mixtures thereof. The most preferred fuel, however, is methanol.

To achieve the full ion-conducting property of proton exchange membranes, in some embodiments suitable acids (gases or liquids) are typically added to the fuel. For example, $SO_2$, $SO_3$, sulfuric acid, trifluoromethanesulfonic acid or the fluoride thereof, also strongly acidic carboxylic acids such as trifluoroacetic acid, and volatile phosphoric acid compounds may be used (see, "Ber. Bunsenges. Phys. Chem.", Volume 98 (1994), pages 631 to 635).

Fuel Cell Uses

As set forth above, the alloy compositions of the present invention are useful as electrocatalysts in fuel cells which generate electrical energy to perform useful work. For example, the alloy compositions may be used in fuel cells which are in electrical utility power generation facilities; uninterrupted power supply devices; extraterrestrial vehicles; transportation equipment such as heavy trucks, automobiles, and motorcycles (see, Fuji et al., U.S. Pat. No. 6,048,633; Shinkai et al., U.S. Pat. No. 6,187,468; Fuji et al., U.S. Pat. No. 6,225,011; and Tanaka et al., U.S. Pat. No. 6,294,280); residential power generation systems; mobile communications equipment such as wireless telephones, pagers, and satellite phones (see, Prat et al., U.S. Pat. No. 6,127,058 and Kelley et al., U.S. Pat. No. 6,268,077); mobile electronic devices such as laptop computers, personal data assistants, audio recording and/or playback devices, digital cameras, digital video cameras, and electronic game playing devices; military and aerospace equipment such as global positioning satellite devices; and robots.

EXAMPLE 1

Forming Electrocatalytic Alloys on Individually Addressable Electrodes

Electrocatalyst alloy compositions of the present invention were prepared using the combinatorial techniques disclosed in Warren et al., U.S. Pat. No. 6,187,164; Wu et al., U.S. Pat. No. 6,045,671; Strasser, P., Gorer, S. and Devenney, M., *Combinatorial Electrochemical Techniques For The Discovery of New Fuel-Cell Cathode Materials*, Nayayanan, S. R., Gottesfeld, S. and Zawodzinski, T., eds., Direct Methanol Fuel Cells, Proceedings of the Electrochemical Society, New Jersey, 2001, p. 191; and Strasser, P., Gorer, S. and Devenney, M., *Combinatorial Electrochemical Strategies For The Discovery of New Fuel-Cell Electrode Materials*, Proceedings of the International Symposium on Fuel Cells for Vehicles, 41st Battery Symposium, The Electrochemical Society of Japan, Nagoya 2000, p. 153. For example, an array of independent electrodes (with areas of between about 1 and 3 mm$^2$) may be fabricated on inert substrates (e.g., glass, quartz, sapphire alumina, plastics, and thermally treated silicon). The individual electrodes are located substantially in the center of the substrate, and are connected to contact pads around the periphery of the substrate with wires. The electrodes, associated wires, and contact pads are fabricated from conducting materials (e.g., gold, silver, platinum, copper or other commonly used electrode materials).

Specifically, the alloy compositions of this invention were prepared using a photolithography/RF magnetron sputtering technique (GHz range) to deposit thin-film alloys on arrays of 64 individually addressable electrodes. A quartz insulating substrate was provided and photolithographic techniques were used to design and fabricate the electrode patterns on it. By applying a predetermined amount of photoresist to the substrate, photolyzing preselected regions of the photoresist, removing those regions that have been photolyzed (e.g., by using an appropriate developer), depositing a layer of titanium about 500 nm thick using RF magnetron sputtering over the entire surface and removing predetermined regions of the deposited titanium (e.g. by dissolving the underlying photoresist), intricate patterns of individually addressable electrodes were fabricated on the substrate.

Referring to FIG. 3, the fabricated array 20 consisted of 64 individually addressable electrodes 21 (about 1.7 mm in diameter) arranged in an 8×8 square that were insulated from each other (by adequate spacing) and from the substrate 24 (fabricated on an insulating substrate), and whose interconnects 22 and contact pads 23 were insulated from the electrochemical testing solution (by the hardened photoresist or other suitable insulating material).

After the initial array fabrication and prior to depositing the electrocatalyst alloys for screening, a patterned insulating layer covering the wires and an inner portion of the peripheral contact pads, but leaving the electrodes and the outer portion of the peripheral contact pads exposed (preferably approximately half of the contact pad is covered with this insulating layer) was deposited. Because of the insulating layer, it is possible to connect a lead (e.g., a pogo pin or an alligator clip) to the outer portion of a given contact pad and address its associated electrode while the array is immersed in solution, without having to worry about reactions that can occur on the wires or peripheral contact pads. The insulating layer was a hardened photoresist, but any other suitable material known to be insulating in nature could have been used (e.g., glass silica, alumina, magnesium oxide, silicon nitride, boron nitride, yttrium oxide, or titanium dioxide).

Following the creation of the titanium coated array, a steel mask having 64 holes (1.7 mm in diameter) was pressed onto the substrate to prevent deposition of sputtered material onto the insulating resist layer. The deposition of the electrocatalyst alloys was also accomplished using RF magnetron sputtering and a two shutter masking system as described by Wu et al. which enable the deposition of material onto 1 or more electrodes at a time. Each individual thin-film electrocatalyst alloy is created by a super lattice deposition method. For example, when preparing a ternary alloy electrocatalyst composition, metals M1, M2 and M3 are to be deposited and alloyed onto one electrode. First, a metal M1 sputter target is selected and a thin film of M1 having a defined thickness is deposited on the electrode. This initial thickness is typically from about 3 to about 12 Å. After this, metal M2 is selected as the sputter target and a layer of M2 is deposited onto the layer of M1. The thickness of M2 layer is also from about 3 to about 12 Å. The thicknesses of the deposited layers are in the range of the diffusion length of the metal atoms (e.g., about 10 to about 30 Å) which allows in-situ alloying of the metals. Then, a layer of M3 is deposited onto the M1-M2 alloy forming a M1-M2-M3 alloy film. As a result of the three deposition steps, an alloy thin-film (9–25 Å thickness) of the desired stoichiometry is created. This concludes one deposition cycle. In order to achieve the desired total thickness of a cathode electrocatalysts material, deposition cycles are repeated as necessary which results in the creation of a super lattice structure of a defined total thickness (typically about 700 Å). Although the number, thickness (stoichiometry) and order of application of the individual metal layers may be determined manually, it is desirable to utilize a computer program to design an output file which contains the information necessary to control the operation of the sputtering device during the preparation of a particular library wafer (i.e., array). One such computer program is the LIBRARY STUDIO software available from Symyx Technologies, Inc. of Santa Clara, Calif. and described in European Patent No. 1080435 B1. The compositions of several as sputtered alloy compositions were analyzed using x-ray fluorescence (XRF) to confirm that they were consistent with desired compositions (chemical compositions determined using x-ray fluorescence are within about 5% of the actual composition).

Arrays were prepared to evaluate the specific alloy compositions of the present invention. On each array one electrode consisted essentially of platinum and it served as an internal standard for the screening operation. Additionally, the results for the alloys may be evaluated against an external platinum standard comprising an array of 64 platinum electrodes in which the oxygen reduction activity of the 64 platinum electrodes averaged −0.35 mA/cm² at +0.1V vs. a mercury/mercury sulfate electrode to determine the experimental error of the oxygen reduction test.

EXAMPLE 2

Screening Alloys for Electrocatalytic Activity

The alloy compositions synthesized on an array according the method set forth in Example 1 were screened in 1 M $HClO_4$ electrolyte for electrochemical reduction of molecular oxygen to water to determine relative electrocatalytic activity against the internal and/or external platinum standard.

In general, an array wafer was assembled into an electrochemical screening cell and a screening device established an electrical contact between the 64 electrode electrocatalysts (working electrodes) and a 64-channel multi channel potentiostat used for the screening. Specifically, each wafer array was placed into a screening device such that all 64 spots are facing upward and a tube cell body that was generally annular and having an inner diameter of about 2 inches (5 cm) was pressed onto the upward facing wafer surface. The diameter of this tubular cell was such that the portion of the wafer with the square electrode array formed the base of a cylindrical volume while the contact pads were outside the cylindrical volume. A liquid ionic solution (electrolyte) is poured into this cylindrical volume and a common counter electrode (i.e., platinum gauze), as well as a common reference electrode (e.g., mercury/mercury sulfate reference electrode (MMS)), were placed into the electrolyte solution to close the electrical circuit.

A rotator shaft with blades was also placed into the electrolyte to provide forced convection-diffusion conditions during the screening. The rotation rate was typically between about 300 to about 400 rpm. Depending on the screening experiment either argon or pure oxygen is bubbled through the electrolyte during the measurements. Argon serves to remove $O_2$ gas in the electrolyte to simulate $O_2$-free conditions used for the initial conditioning of the electrocatalysts. The introduction of pure oxygen serves to saturate the electrolyte with oxygen for the oxygen reduction reaction. During the screening, the electrolyte was maintained at 60° C. and the rotation rate was constant. Three groups of tests were performed to screen the activity of the electrocatalysts. The electrolyte (1 M $HClO_4$) was purged with argon for about 20 minutes prior to the electrochemical measurements. The first group of tests comprised cyclic voltammetric measurements while purging the electrolyte with argon. Specifically, the first group of tests comprised:
  a. a potential sweep from about OCP to about +0.3 V to about −0.63 V and back to about +0.3 V at a rate of about 20 mV/s;
  b. twelve consecutive potential sweeps from OCP to about +0.3 V to about −0.7 V and back to about +0.3 V at a rate of about 200 mV/s; and
  c. a potential sweep from about OCP to about +0.3 V to about −0.63 V and back to about +0.3 V at a rate of about 20 mV/s.

The electrolyte was then purged with oxygen for approximately 30 minutes. The following second group of tests were performed while continuing to purge with oxygen:
  a. measuring the open circuit potential (OCP) for a minute; then, starting at OCP the voltage was swept down to about −0.4 V at a rate of about 10 mV/s;
  b. measuring the OCP for a minute; then applying a potential step from OCP to about +0.1 V while measuring the current for about 5 minutes; and
  c. measuring the OCP for a minute; then applying a potential step from OCP to about +0.2 V while monitoring the current for about 5 minutes.

The third group of tests comprised a repeat of the second group of tests after about one hour from completion of the second group of tests. The electrolyte was continually stirred and purged with oxygen during the waiting period. All the foregoing test voltages are with reference to a mercury/mercury sulfate (MMS) electrode.

Specific alloy compositions of the present invention were prepared and screened in accordance with the above-described methods and the results are set forth in FIG. 4. The results in FIG. 4 are for the third test group steady state currents at +0.1 V MMS. The current value reported (End Current Density) is the result of averaging the last three current values of the chronoamperometric test normalized for geometric surface area.

EXAMPLE 3

Synthesis of Supported Electrocatalyst Alloys

Electrocatalyst alloy compositions of the present invention were synthesized on carbon support particles. To do so, the alloy component precursors were deposited or precipitated on supported platinum powder (i.e., platinum nanoparticles supported on carbon black particles). Platinum supported on carbon black is commercially available from companies such as Johnson Matthey, Inc., of New Jersey and E-Tek Div. of De-Nora, N.A., Inc., of Sommerset, N.J. Such supported platinum powder is available with a wide range of platinum loading. The supported platinum powder used in this example had a nominal platinum loading of about 40 percent by weight, a platinum surface area of between about 150 and about 170 $m^2/g$ (determined by CO adsorption), a combined carbon and platinum surface area between about 350 and about 400 $m^2/g$ (determined by $N_2$ adsorption), and an average particle size of less than about 0.5 mm (determined by sizing screen).

Referring to FIG. 5, the supported electrocatalyst alloys corresponding to HG-2-700 and HG-2-900 were synthesized on carbon support particles using a precipitation method according to the following steps. First, about 0.5 g of carbon supported platinum powder (36.4 wt % Pt) was dispersed in about 200 mL of room temperature 18 MΩ deionized water using an ultrasonic blending device (e.g., an AQUASONIC 50 D set at power level 9) for about 2 hours to form a slurry. The slurry was stirred using a magnetic stirring device, and while being stirred, appropriate volumes based on the targeted electrocatalyst composition of one or more appropriate solutions comprising the metals to be alloyed with the platinum nanoparticles were added drop-wise to the slurry (e.g., a 1M rhodium nitrate aqueous solution, a 1M ammonium molybdate aqueous solution, 1M nickel nitrate aqueous solution, and a 1M iron (III) nitrate nonahydrate aqueous solution). The stirring was continued and the slurry containing the dissolved metal salts was heated to a temperature between about 60 and about 90° C. for about 1 hour. Precipitation of compounds comprising the metals was then initiated. In this example, a 10 wt % ammonium hydroxide aqueous solution was slowly added to the slurry until the slurry had a pH of about 10. The slurry was stirred for about 15 more minutes. The slurry was then filtered from the liquid under vacuum after which the filtrate was washed with about 150 mL of deionized water. The powder was then dried at a temperature between about 60 and about 100° C. for about 4 hours to about 8 hours.

Referring to FIG. 5, the electrocatalyst alloys corresponding to HFC 136, HFC 137, HFC 138, and HFC 139 were formed on carbon support particles using a freeze-drying impregnation method. The freeze-drying method comprised forming a precursor solution comprising the desired metal atoms in the desired concentrations. For example, to prepare the $Pt_{38}Rh7Mo_{19}Ni_{36}$ alloy compositions (HFC 138 and HFC 139) about 0.017 g of $(NH_4)Mo_7O_{24}.4H_2O$ was dissolved in about 5 ml $H_2O$. Next, about 0.054 g of $Ni(NO_3)_2.6H_2O$ was dissolved in the previous solution resulting in a light blue clear solution. Next, about 0.026 ml of a $Rh(NO_3)_3$ solution [about 10 wt % Rh solution in $HNO_3$] was added to the previous solution yielding a yellow-green clear solution. To prepare the $Pt_{20}Rh_{20}Mo_{40}Fe_{20}$ alloy compositions (HFC 136 and HFC 137) about 0.070 .g of $(NH_4)Mo_7O_{24}.4H_2O$ was dissolved in about 3 ml $H_2O$. Then about 0.144 ml of a $Rh(NO_3)_3$ solution [about 10 wt % Rh solution in $HNO_3$] was added to the previous solution to yield a clear first solution. A second solution was prepared by dissolving about 0.080 g of $Fe(NO_3)_3.9H_2O$ in about 2 ml $H_2O$ which was added to the first solution to yield to yield a yellow-orange suspension. The suspension was sealed in a vial and heated to about 100° C. for about 2 minutes to dissolve the suspension and form a yellow-orange clear solution. The solutions were then introduced into separate HDPE (High Density Poly Ethylene) vials containing about 0.200 g of supported platinum powder which had a nominal platinum loading of about 19.2 percent by weight resulting in a black suspension. The suspensions were homogenized by immersing a probe of a BRANSON SONIFIER 150 into the vials and sonicating the suspensions for about 1 minute at a power level of 3. The vials containing the homogenized suspensions were then immersed in a liquid nitrogen bath for about 3 minutes to solidify the suspensions. The solid suspensions were then freeze-dried for about 24 hours using a LABONCO FREEZE DRY SYSTEM (Model 79480) to remove the solvent. The tray and the collection coil of the freeze dryer were maintained at about 26° C. and about −48° C., respectively, while evacuating the system (the pressure was maintained at about 0.15 mbar). After freeze-drying, the first vial contained a powder comprising the supported platinum powder and rhodium, molybdenum, and nickel precursors deposited thereon. Likewise, the second vial contained a powder comprising the supported platinum powder and rhodium, molybdenum, and iron precursors deposited thereon.

The recovered precursor powders (both precipitated and freeze-dried) were then subjected to a heat treatment to reduce the precursors to their metallic state and to alloy the metals with each other and the platinum on the carbon black particles. One particular heat treatment comprised heating the powder in a quartz flow furnace with an atmosphere comprising about 6% $H_2$ and 94% Ar using a temperature profile of room temperature to about 40° C. at a rate of about 5° C./min; holding at about 40° C. for 2 hours; increasing the temperature to about 200 C at a rate of 5° C./min; holding at about 200 C for two hours; increasing the temperature at a rate of about 5° C./min to about 700° C.; holding at about 700° C. for about 8 hours; and cooling down to room temperature. Another heat treatment was identical to the foregoing heat treatment except that the maximum temperature was about 900° C.

In order to determine the actual composition of the supported electrocatalyst alloys, differently prepared alloys (e.g., by composition variation or by heat treatment variation) were subjected to ICP elemental analysis or subjected to EDS (Electron Dispersive Spectroscopy) elemental analysis. For the latter technique, the sample powders were compressed into 6 mm diameter pellets with a thickness of about 1 mm. The target alloy composition and actual composition for several supported electrocatalyst alloys are set forth in FIG. 5.

EXAMPLE 4

Evaluating the Electrocatalytic Activity of Supported Electrocatalysts

The supported alloy electrocatalysts formed according to Example 3 were then subjected to electrochemical measurements to evaluate their activities. For the evaluation, the supported alloy electrocatalysts were applied to a rotating disk electrode (RDE) as is commonly used in the art (see, e.g., Rotating disk electrode measurements on the CO tolerance of a high-surface area Pt/Vulcan carbon fuel cell electrocatalyst, Schmidt et al., Journal of the Electrochemical Society (1999), 146(4), 1296–1304; and Characterization of high-surface-area electrocatalysts using a rotating disk electrode configuration, Schmidt et al., Journal of the Electrochemical Society (1998), 145(7), 2354–2358). Rotating disk electrodes are a relatively fast and simple screening tool for evaluating supported electrocatalysts with respect to their intrinsic electrolytic activity for oxygen reduction (e.g., the cathodic reaction of a fuel cell).

The rotating disk electrode was prepared by depositing an aqueous-based ink that comprises the support electrocatalyst and a NAFION solution on a glassy carbon disk. The concentration of electrocatalyst powder in the NAFION solution was about 1 mg/mL. The NAFION solution comprised the perfluorinated ion-exchange resin, lower aliphatic alcohols and water, wherein the concentration of resin is about 5 percent by weight. The NAFION solution is commercially available from the ALDRICH catalog as product number 27,470-4. The glassy carbon electrodes were 5 mm in diameter and were polished to a mirror finish. Glassy carbon electrodes are commercially available, for example, from Pine Instrument Company of Grove City, Pa. An aliquot of 10 µL electrocatalyst suspension was added to the carbon substrate and allowed to dry at a temperature between about 60 and 70° C. The resulting layer of NAFION and electrocatalyst was less than about 0.2 µm thick. This method produced slightly different platinum loadings for each electrode made with a particular suspension, but the variation was determined to be less than about 10 percent by weight.

After being dried, the rotating disk electrode was immersed into an electrochemical cell comprising an aqueous 0.5 M $H_2SO_4$ electrolyte solution maintained at room temperature. Before performing any measurements, the electrochemical cell was purged of oxygen by bubbling argon through the electrolyte for about 20 minutes. All measurements were taken while rotating the electrode at about 2000 rpm, and the measured current densities were normalized either to the glassy carbon substrate area or to the platinum loading on the electrode. Two groups of tests were performed to screen the activity of the supported electrocatalysts. The first group of tests comprised cyclic voltammetric measurements while purging the electrolyte with argon. Specifically, the first group comprised:

a. two consecutive potential sweeps starting from OCP to about +0.35V then to about −0.65V and back to OCP at a rate of about 50 mV/s;

b. two hundred consecutive potential sweeps starting from OCP to about +0.35V then to about −0.65V and back to OCP at a rate of about 200 mV/s; and c. two consecutive potential sweeps starting from OCP to about +0.35V then to about −0.65V and back to OCP at a rate of about 50 mV/s.

The second test comprised purging with oxygen for about 15 minutes followed by a potential sweep test for oxygen reduction while continuing to purge the electrolyte with oxygen. Specifically, potential sweeps from about −0.45 V to +0.35 V were performed at a rate of about 5 mV/s to evaluate the initial activity of the electrocatalyst as a function of potential and to create a geometric current density plot. The electrocatalysts were evaluated by comparing the diffusion corrected activity at 0.15 V.

All the foregoing test voltages are with reference to a mercury/mercury sulfate electrode. Also, it is to be noted that the oxygen reduction measurements for a glassy carbon RDE without an electrocatalyst did not show any appreciable activity within the potential window.

The above-described supported electrocatalyst alloy compositions were evaluated in accordance with the above-described method and the results are set forth in FIG. 5. The results of the evaluation as set forth in FIG. 5 indicate, among other things, that it may take numerous iterations to develop a set of parameters for producing the target alloy composition. Also evidenced by the data, is that activity can be adjusted by changes in the processing conditions. For example, despite having compositions which are essentially identical (within the experimental error of the detection method), the $Pt_{49}Rh_8Mo_5Ni_{38}$ (700° C.) electrocatalyst had a higher activity than the $Pt_{50}Rh_7Mo_5Ni_{38}$ (900° C.) electrocatalyst. This difference in activity may be due to several factors such as alloy homogeneity (e.g., an alloy, as defined above, may have regions in which the constituent atoms show a presence or lack of order, i.e., regions of solid solution within an ordered lattice, or some such superstructure), changes in the lattice parameter due to changes in the average size of component atoms, changes in particle size, and changes in crystallographic structure/symmetry. For example, Pt, Rh, Ni, and certain Pt—Rh alloys have a face-centered cubic (fcc) structure whereas Mo and Fe often crystallize in a body-centered cubic (bcc) structure. Pt—Fe alloys also crystallize in structures from primitive cubic to primitive tetragonal. Clearly symmetry variations are to be expected across a multi-component compositional range. For example, in the Pt—Fe system, as the amount of iron added to platinum increases, the lattice of the resulting alloy may be expected to change from an fcc lattice to a tetragonal primitive lattice. Without being held to a particular theory, in certain cases, for example Pt—Rh, extended and/or complete solid solutions may exist between metals that are similar in size and electronic characteristics. However, the possibility also exists that as the relative ratio of metal (Rh, Mo, Ni/Fe) to platinum goes from 0 to 1, a solid solution first occurs (e.g., Fe and Pt may mix randomly within some concentration limits, or under some specific synthesis conditions), and out of this solid solution an ordered phase may gradually crystallize (e.g., $Pt_3Fe$ or $Pt_3Mo$) only to return to a solid solution (disordered alloy) and again back to an ordered phase as the formula PtFe or PtMo is achieved. Symmetry changes (e.g., those associated with the changes from a cubic face-centered structure to a primitive tetragonal structure) may result in significant changes in the x-ray diffraction pattern. These changes may also be accompanied by more subtle changes in lattice parameters that may be indicative of the resulting changes in the size of the respective metal constituents. For example, the 12-coordinate metallic radii of platinum, rhodium, molybdenum, nickel and iron are 1.39 D, 1.34 D, 1.40 D, 1.25 D, and 1.26 D, respectively, and as metals are substituted for platinum, the average metal radius, and consequently the observed lattice parameter may be expected to shrink or expand accordingly.

Thus, the average radius may be used as an indicator of lattice changes as a function of stoichiometry, or alternatively, as an indicator of stoichiometry based on observed diffraction patterns. However, while the average radii may be useful as a general rule, experimental results are typically expected to conform only in a general manner because local ordering, significant size disparity between atoms, significant changes in symmetry, and other factors may produce results that are inconsistent with expectations.

An interpretation of XRD analysis for the foregoing supported alloys is set forth below. Interpretation of XRD analyses can be subjective, and therefore, the following conclusions are not intended to be limiting.

The predicted change in the average radius for the $Pt_{49}Rh_8Mo_5Ni_{38}$ alloy, based on the ICP-measured stoichiometry, was a contraction of approximately 3.8% versus platinum. The observed contraction of 3.5%, as determined by XRD measurements, agrees well within the experimental error of the method. Although the resulting composition of this example varies from the target composition, the XRD data is consistent with the measured composition. HG-2-700 and -900 (see, FIG. 5) both display a disordered alloy structure according to XRD, with the only apparent differences being related to crystallinity and possibly particle size.

The predicted change in the average radius for the $Pt_{33}Rh_7Mo_{25}Ni_{35}$, based on the EDS-measured stoichiometry, was a contraction of approximately 3.4% versus platinum. The observed contraction of 3.2%, as determined by XRD measurements, agrees well within the experimental error of the method. HFC 138 and 139 (see, FIG. 5) both display a disordered alloy structure according to XRD. Very slight crystallinity differences are noted between the two materials, however, these differences appear significant in terms of the resulting electrochemical performance noted in FIG. 5.

The predicted change in the average radius for the $Pt_{19}Rh_{18}Mo_{47}Fe_{17}$, based on the EDS-measured stoichiometry, was a contraction of approximately 0.7% versus platinum. The observed XRD data, however, indicate the presence of a $Mo_2C$ impurity as well as the expected transition metal doped noble metal alloy phase. Ignoring the $Mo_2C$ impurity, the observed contraction of the alloy phase is approximately 2.1%. Based on a theoretical average radius calculation, the observed alloy phase may have a stoichiometry of approximately $Pt_{22}Rh_{21}Mo_{37}Fe_{20}$. Although the crystallinity of the $MO_2C$ phase increases with increasing temperature, the alloy phase is quite similar at both temperatures. As such the electrochemical performances of HFC 136 and HFC 137 are similar (see, FIG. 5).

In view of the foregoing, for a particular electrocatalyst composition a determination of the optimum conditions is preferred to produce the highest activity for that particular composition. For example, the starting materials used to synthesize the alloy may play a role in the activity of the synthesized alloy. Specifically, using something other than a metal nitrate salt solution to supply the metal atoms may result in different activities. Different methods of synthesis (e.g., co-precipitation and freeze-drying impregnation) may result in differing activities due to both differences in particle size and/or differences in stoichiometric control. Heat treatment parameters such as atmosphere, time, temperature, etc. may also need to be optimized. This optimization may involve balancing competing phenomenon. For example, increasing the heat treatment temperature is generally known to improve the reduction of a metal salt to a metal which typically increases activity; however, it also tends to increase the size of the electrocatalyst alloy particle and decrease surface area, which decreases electrocatalytic activity.

Definitions

Activity is defined as the maximum sustainable, or steady state, current (Amps) obtained from the electrocatalyst, when fabricated into an electrode, at a given electric potential (Volts). Additionally, because of differences in the geometric area of electrodes, when comparing different electrocatalysts, activity is often expressed in terms of current density $(A/cm^2)$.

An alloy is a mixture comprising two or more metals. An alloy may be described as a solid solution in which the solute and solvent atoms (the term solvent is applied to the metal that is in excess) are arranged at random, much in the same way as a liquid solution may be described. If some solute atoms replace some of those of the solvent in the structure of the latter, the solid solution may be defined as a substitutional solid solution. Alternatively, an interstitial solid solution is formed if a smaller atom occupies the interstices between the larger atoms. Combinations of the two types are also possible. Furthermore, in certain solid solutions, some level of regular arrangement may occur under the appropriate conditions resulting in a partial ordering that may be described as a superstructure. These solid solutions may have characteristics that may be distinguishable through characterization techniques such as XRD. Significant changes in XRD may be apparent due to changes in symmetry, if more complete ordering occurs such as that which occurs between Pt metal and $Pt_3Fe$. Although the global arrangement of the atoms is extremely similar in both cases, the relationship between the locations of the Pt and Fe atoms is now ordered and not random resulting in different diffraction patterns. Further, a homogeneous alloy is a single compound comprising the constituent metals. A heterogeneous alloy comprises an intimate mixture of crystals of individual metals and/or metallic compounds. An alloy, as defined herein, is also meant to include materials which may comprise elements which are generally considered to be non-metallic. For example, some alloys of the present invention may comprise oxygen in atomic, molecular, and/or metallic oxide form. Additionally, some alloys of the present invention may comprise carbon in atomic, molecular, and/or metal carbide form. See, e.g., Structural Inorganic Chemistry, A. F. Wells, Oxford University Press, $5^{th}$ Edition, 1995, chapter 29. If present, the amount of oxygen and/or carbon in the alloy is typically at what is generally considered to be a low level (e.g., less than about 5 weight percent), however higher concentrations are also possible (e.g., up to about 10 weight percent).

It is to be understood that the above description is intended to be illustrative and not restrictive. Many embodiments will be apparent to those of skill in the art upon reading the above description. The scope of the invention should therefore be determined not with reference to the above description alone, but should be determined with reference to the claims and the full scope of equivalents to which such claims are entitled.

What is claimed is:

1. A catalyst for use in oxidation or reduction reactions, the catalyst composition comprising platinum, rhodium, molybdenum, and nickel, iron, or a combination of nickel and iron, wherein the concentration of platinum therein is between about 10 and about 50 atomic percent.

2. The catalyst of claim 1 consisting essentially of platinum, rhodium, molybdenum, and nickel or iron.

3. The catalyst of claim 1 wherein the concentration of rhodium is between about 0.1 and about 50 atomic percent, the concentration of molybdenum is between about 0.1 and about 55 atomic percent, and the concentration of nickel, iron, or a combination of nickel and iron is between about 0.1 and about 55 atomic percent.

4. The catalyst of claim 3 wherein the concentration of platinum is between about 20 and about 50 atomic percent, the concentration of rhodium is between about 5 and about 25 atomic percent, the concentration of molybdenum is between about 5 and about 45 atomic percent, the concentration of nickel is between about 5 and about 55 atomic percent.

5. The catalyst of claim 4 wherein the sum of the concentrations of platinum and rhodium is between about 40 and about 50 atomic percent.

6. The catalyst of claim 4 wherein the concentration of platinum is between about 30 and about 40 atomic percent, the concentration of rhodium is between about 5 and about 10 atomic percent, the concentration of molybdenum Is between about 5 and about 35 atomic percent, and the concentration of nickel is between about 25 and about 50 atomic percent.

7. The catalyst of claim 3 wherein the concentration of platinum is from about 10 to about 30 atomic percent, the concentration of rhodium is from about 10 to about 30 atomic percent, the concentration of molybdenum is from about 30 to about 55 atomic percent and the concentration of iron is from about 10 to about 30 atomic percent.

8. The catalyst of claim 7 wherein the concentration of platinum is from about 15 to about 25 atomic percent, the concentration of rhodium is from about 15 to about 25 atomic percent, the concentration of molybdenum is from about 35 to about 45 atomic percent and the concentration of iron is from about 15 to about 25 atomic percent.

9. An alloy comprising platinum, rhodium, molybdenum, and nickel, iron, or a combination of nickel and iron, wherein the concentration of platinum therein is between about 10 and about 50 atomic percent.

10. The alloy of claim 9 consisting essentially of platinum, rhodium, molybdenum, and nickel or iron.

11. The alloy of claim 9 wherein the concentration of platinum is between about 20 and about 50 atomic percent, the concentration of rhodium is between about 5 and about 25 atomic percent, the concentration of molybdenum is between about 5 and about 45 atomic percent, the concentration of nickel is between about 5 and about 55 atomic percent.

12. The alloy of claim 11 wherein the sum of the concentrations of platinum and rhodium is between about 40 and about 50 atomic percent.

13. The alloy of claim 11 wherein the concentration of platinum is between about 30 and about 40 atomic percent, the concentration of rhodium is between about 5 and about 10 atomic percent, the concentration of molybdenum is between about 5 and about 35 atomic percent, and the concentration of nickel is between about 25 and about 50 atomic percent.

14. The alloy of claim 9 wherein the concentration of platinum is from about 10 to about 30 atomic percent, the concentration of rhodium is from about 10 to about 30 atomic percent, the concentration of molybdenum is from about 30 to about 55 atomic percent and the concentration of iron is from about 10 to about 30 atomic percent.

15. The alloy of claim 14 wherein the concentration of platinum is from about 15 to about 25 atomic percent, the concentration of rhodium is from about 15 to about 25 atomic percent, the concentration of molybdenum is from about 35 to about 45 atomic percent and the concentration of iron is from about 15 to about 25 atomic percent.

16. A supported electrocatalyst particle for use in electrochemical reactor devices, the supported electrocatalyst particle comprising an electrocatalyst and an electrically conductive support particle upon which the electrocatalyst is dispersed, the electrocatalyst comprising platinum, rhodium, molybdenum, and nickel, iron, or a combination of nickel and iron, wherein the concentration of platinum is between about 10 and about 50 atomic percent.

17. The supported electrocatalyst particle of claim 16 wherein the electrically conductive support particle is selected from the group consisting of oil furnace black, acetylene black, graphite paper, carbon fabric and carbon aerogel.

18. The supported electrocatalyst particle of claim 16 wherein the electrocatalyst consists essentially of platinum, rhodium, molybdenum, and nickel or iron.

19. The supported electrocatalyst particle of claim 16 wherein the concentration of platinum is between about 20 and about 50 atomic percent, the concentration of rhodium is between about 5 and about 25 atomic percent, the concentration of molybdenum is between about 5 and about 45 atomic percent, the concentration of nickel is between about 5 and about 55 atomic percent.

20. The supported electrocatalyst particle of claim 19 wherein the sum of the concentrations of platinum and rhodium is between about 40 and about 50 atomic percent.

21. The supported electrocatalyst particle of claim 19 wherein the concentration of platinum is between about 30 and about 40 atomic percent, the concentration of rhodium is between about 5 and about 10 atomic percent, the concentration of molybdenum is between about 5 and about 35 atomic percent, and the concentration of nickel is between about 25 and about 50 atomic percent.

22. The supported electrocatalyst particle of claim 16 wherein the concentration of platinum is from about 10 to about 30 atomic percent, the concentration of rhodium is from about 10 to about 30 atomic percent, the concentration of molybdenum is from about 30 to about 55 atomic percent and the concentration of iron is from about 10 to about 30 atomic percent.

23. The supported electrocatalyst particle of claim 22 wherein the concentration of platinum is from about 15 to about 25 atomic percent, the concentration of rhodium is from about 15 to about 25 atomic percent, the concentration of molybdenum is from about 35 to about 45 atomic percent and the concentration of iron is from about 15 to about 25 atomic percent.

* * * * *